United States Patent
Brandeau (10) Patent No.: US 8,002,294 B2
(45) Date of Patent: Aug. 23, 2011

(54) VEHICLE WHEEL ASSEMBLY WITH A MECHANISM COMPENSATING FOR A VARYING WHEEL RADIUS

(75) Inventor: Erich John Brandeau, Papillion, NE (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 12/634,894

(22) Filed: Dec. 10, 2009

(65) Prior Publication Data

US 2011/0140383 A1 Jun. 16, 2011

(51) Int. Cl.
*E02F 3/76* (2006.01)
(52) U.S. Cl. .......................... 280/80.1; 301/5.1
(58) Field of Classification Search .................. 301/5.1; 280/80.1, 229
See application file for complete search history.

(56) References Cited

U.S. PATENT DOCUMENTS

| | | | |
|---|---|---|---|
| 2,786,540 A * | 3/1957 | Sfredda | 180/24.08 |
| 2,790,503 A | 4/1957 | Kopczynski | |
| 2,819,767 A * | 1/1958 | Kopczynski | 180/363 |
| 3,194,583 A * | 7/1965 | Nottage | 280/229 |
| 4,102,423 A | 7/1978 | Reid | |
| 4,575,354 A | 3/1986 | Wakayama et al. | |
| 4,674,757 A | 6/1987 | Martin | |
| 4,817,747 A | 4/1989 | Kopczynski | |
| 4,941,539 A | 7/1990 | Kopczynski | |
| 4,941,676 A | 7/1990 | Kopczynski | |
| 4,948,167 A | 8/1990 | Kopczynski | |
| 4,969,530 A | 11/1990 | Kopczynski | |
| 5,249,847 A * | 10/1993 | Lee | 301/105.1 |
| 6,604,589 B2 | 8/2003 | Sepitka | |

OTHER PUBLICATIONS

Dempster, Tyra, "Chinese man reinvents the wheel" Wed. Jun. 17, 2009, http://in.reuters.com/articlePrint?articleId=INTRE55G1GB20090617; retrieved from Internet Dec. 10, 2009.
Square wheel, from Wikipedia, the free encyclopedia, http://en.wikipedia.org/wiki/Square_wheel; retrived from Internet Dec. 10, 2009.

* cited by examiner

*Primary Examiner* — Eric Culbreth
(74) *Attorney, Agent, or Firm* — Marsh Fischmann & Breyfogle LLP; Kent A. Lembke (57) ABSTRACT

A non-circular wheel assembly for vehicles. The wheel assembly includes a wheel body having a first radius and a second radius, measured from a center of rotation of the wheel body. The wheel assembly includes a compensation mechanism compensating for changing height values of the center of rotation with respect to an external contact surface of the wheel during rotation. The compensation mechanism includes a linear support member with a first connector mounting a vehicle frame to the wheel body. A second connector adjustably connects the compensation mechanism to the wheel body and is positioned at the center of rotation but apart from the first connector. The compensation mechanism includes a linear position assembly adjusting positions of the second connector relative to the first connector during rotation, which allows a distance between the first connector and the outer contact surface to remain constant to provide a single ride height.

14 Claims, 8 Drawing Sheets

VEHICLE WHEEL ASSEMBLY WITH A MECHANISM COMPENSATING FOR A VARYING WHEEL RADIUS

BACKGROUND

1. Field of the Description

The present description relates, in general, to wheeled vehicles and wheel design, and, more particularly, to vehicle wheels that are non-circular that include, one or more devices to compensate for variances in the wheel radius to provide a smooth or planar/consistent ride for the vehicle frame supported on the non-circular wheel(s).

2. Relevant Background

In the entertainment industry, there is an ongoing search for eye-catching and surprising visual effects. For example, theme parks and other entertainment venues often use vehicles in shows and parades to entertain their visitors or an audience, and it is desirable to design the parade vehicles, bicycles, vendor carts, fide vehicles, wheeled-based robotic platforms/floats, and so on so as to provide a visual impact and not just be functional.

Historically and presently, vehicles are supported upon circular wheels and use these wheels for their main mode of locomotion, e.g., the vehicle rolls upon a road or other surface on one to four or more wheels. Circular wheels are desirable for vehicles because they provide a constant radius and a fixed center of rotation that together provides the vehicle (or its frame connected to the center of rotation) a smooth and constant/consistent motion on a flat surface. Despite the many advantages of the basic circular wheel, there is a large potential for entertainment with vehicles having wheels with a variety of shapes including non-circular shapes. The entertainment comes in part due to the fact that a non-circular wheel is unexpected and because humans instinctively associate a rolling motion with a round wheel, which increases the fascination with a non-circular wheel that rolls in a similar way to a round wheel.

Some efforts to use non-circular wheels have been created, but these have typically required a specially-formed rolling surface. For example, there have been a number of vehicle designs that utilize square and other shaped wheels that are used to roll upon a non-flat surface. Specifically, a vehicle with square wheels may be used to roll upon a non-flat/planar road or surface formed with inverted catenaries with arc lengths equal to the side lengths of the square wheel, which maintains a relatively constant height of the center of rotation. These types of vehicles do not require additional mechanisms to maintain a fixed ride height (which provides a smooth ride for the vehicle frame), but they are limited to rolling on a very specifically formed and shaped riding surface.

Another vehicle design has been proposed that uses constant diameter wheels of differing shapes to roll on a flat surface with a relatively smooth ride provided for the supported vehicle frame. For example, a bicycle may be provided that has non-circular wheels of a constant diameter (as measured about the periphery of the entire wheel), and a subset of these shapes is sometimes referred to as Reuleaux shapes or objects. These vehicles exploit the characteristics of a constant diameter wheel or shape to allow them to roll a vehicle on flat surfaces. The bicycle, for example, is adapted to provide a second planar surface on its frame that is parallel to the ground or riding surface plane and that is positioned a distance equal to the fixed diameter of the wheel away from the riding surface. In this manner, the vehicle frame is supported upon the wheel via the second planar surface device(s) and not to the center of rotation as in a common bicycle or other vehicle. While providing a visually surprising effect, these vehicles are limited to use with a wheel with a constant diameter and not useful for more oddly or arbitrarily shaped wheels and are not modular in that they require significant modifications of a vehicle's frame or body.

SUMMARY

The following description provides wheels or wheel assemblies that support use of non-constant diameter wheels with a vehicle. In other words, the wheel assemblies include a compensation mechanism for accounting for the changing/varying radius of the wheel, which may take any arbitrary shape rather than having to be circular or have a constant diameter. The radius compensation mechanism allows the wheel rim or body (or its contact surface) to be non-circular (when viewed from the side of the vehicle such as along an axis passing through a center of rotation of the wheel), such as a triangular wheel, a rounded polygon wheel, a flower shaped wheel, a face profile wheel, or nearly any other non-circular shape. Any of these non-circular or shaped wheels that may have a two or more radii values may be used with the compensation mechanism while providing a smooth or planar ride height for a connected or supported vehicle frame/body (e.g., the mounting point or location for the frame may be maintained at a fixed or constant distance or height relative to the riding surface as may be measured from a mounting/connection location for the frame to the riding surface/ground).

Briefly, the radius compensation mechanism is configured to compensate for the changing radius of the non-circular wheel, and it may take a number of forms to provide such compensation. The vehicle frame is typically mounted to or connected for support to a portion of the radius compensation mechanism. For example, in one embodiment, a cam is provided in the compensation mechanism that is provided in the wheel assembly. A cam track may be provided near the inner portion of the wheel frame/body (such as about the center of the wheel or a selected center of rotation for the wheel) and a cam follower (or pair of such followers) may be positioned to travel on the cam track/path defined by inner and outer cams. The vehicle frame (such as a fork of a bicycle frame) may be mounted to or supported by the cam follower(s) such that the cam follower device supports the weight of the vehicle.

Due to the specifically selected shape of the cam track (or shape of the cam calculated based on the shape of the wheel), the vehicle frame/body does not vibrate or even move up and down as would be intuitively expected but instead is supported to travel in a plane parallel to the riding surface or ground (e.g., the cam follower(s) travel in a plane parallel to the riding surface or ground plane). As a result, the visual impact of the vehicle with irregularly shaped wheels but a smooth riding frame/body is substantial since most viewers of such a bicycle or other vehicle with triangular or other odd shaped wheels expect that the ride would be unbearable and bumpy rather than providing a relatively smooth ride. The shapes that may be used for the vehicle wheels are nearly unlimited. Another advantage of the wheel assemblies is that they are modular in that they may be used directly (or with minor modifications) with existing vehicle frames by simply installing them in place of an existing wheel (such as in place of an existing bicycle wheel with mounting to the front fork or the like). In contrast, other designs required substantial modifications of the vehicle frame and also required use with a constant diameter wheel (or a uniquely shaped riding surface).

In other cases, the radius compensation mechanism may be an electronically compensating system. Such a system may include a linear actuator that drives one or more linear slides (e.g., replaces the cam and followers). A sensing mechanism would be included to act to sense ride height and, in response, to actuate the linear actuator appropriately.

More particularly, a wheel assembly is provided for use with nearly any vehicle that uses one or more wheels for its locomotion on a riding surface (or on the ground plane). The wheel or wheel assembly includes a wheel body that is non-circular and, thus, has at least a first radius and a second radius (but more typically numerous differing radii). The first and second radii are measured from a center of rotation defined/selected for the wheel body outward to first and second locations, respectively, on an outer contact surface of the wheel body (e.g., where a tire may be provided or other traction surface).

The wheel assembly also includes a compensation mechanism that acts to compensate for the changes of the distance of the center of rotation of the wheel to the ground plane as the wheel rolls along the ground plane. The compensation mechanism includes a linear support member (such as a linear slide rail) with a first connector that can be used to provide a mounting point for a vehicle frame (such as a front fork of a bicycle or the like) to the wheel body. A second connector is provided with the linear support member to adjustably connect the compensation mechanism to the wheel body. The second connector is positioned proximate to the center of rotation of the wheel body but spaced some distance apart from the first connector (or point where the vehicle is supported within the wheel assembly). The compensation mechanism includes a linear position assembly that functions to adjust a position of the second connector relative to the first connector in response to the wheel body being rotated between the first and second radii, which allows a distance between the first connector (or frame mount point) and the outer contact surface to remain substantially constant to provide a single ride height despite the changing radii of the wheel body.

The linear support member may include a linear slide rail or similar elongated element, and the second connector may include a linear slide that slidably engages the linear slide rails (e.g., abuts the sides of the rail). The linear slide may be supported within the wheel assembly via an axle member (such as a pin, bolt, or the like with or without other components such as a slide block or bearings) extending outward from the center of rotation of the wheel body (e.g., such that the wheel body may rotate only about the center of rotation while the linear slide is retained vertical to support the rail). The linear position assembly may include a cam assembly with a cam that defines a cam track and with a cam follower. The cam follower may be rigidly attached to the linear support member/slide rail at a location that is spaced apart from the center of rotation. The cam track that the cam follower follows during wheel body rotation may be defined based on the wheel shape (e.g., a mapping of the changing wheel distance from the center of rotation to the ground plane) so as to adjust the position of the second connector relative to the first connector during rotation of the wheel body (e.g., the distance between the two connectors on the linear support member varies to compensate for the changing wheel body radii to provide a constant ride height).

DETAILED DESCRIPTION

The following description is generally directed toward a new wheel or wheel assembly for use with nearly any vehicle that uses wheels so as to allow the wheels to vary in their shape and radii (as measured at several points about a single wheel periphery). Vehicles have historically used circular wheels as a mechanism of locomotion, with the circular wheel providing a constant diameter and radius and also a fixed center of rotation for smooth motion of a supported vehicle body on a flat riding surface (such as a paved road). Non-circular wheels, in contrast, have a radius that changes or that differs at differing locations on its contact surface (or about its periphery as measured to a center or center of rotations chosen for the non-circular wheel).

Hence, it is difficult to roll these non-circular wheels about a fixed center of rotation (with respect to the vehicle) while also maintaining a constant vehicular ride height. One aspect of the wheel assemblies described herein is that they each include a radius compensation mechanism (e.g., a cam-based system, a linear or other actuator that may be programmable to sense radius and adjust in response, or the like) that allows a non-circular (or non-constant radius) wheel to rotate about a fixed center of rotation (with respect to the wheel configuration) while maintaining a constant vehicle ride height (or distance/height of vehicle frame mounting location on the wheel assembly to the mating point between the wheel and the riding surface/ground).

Figure 1:
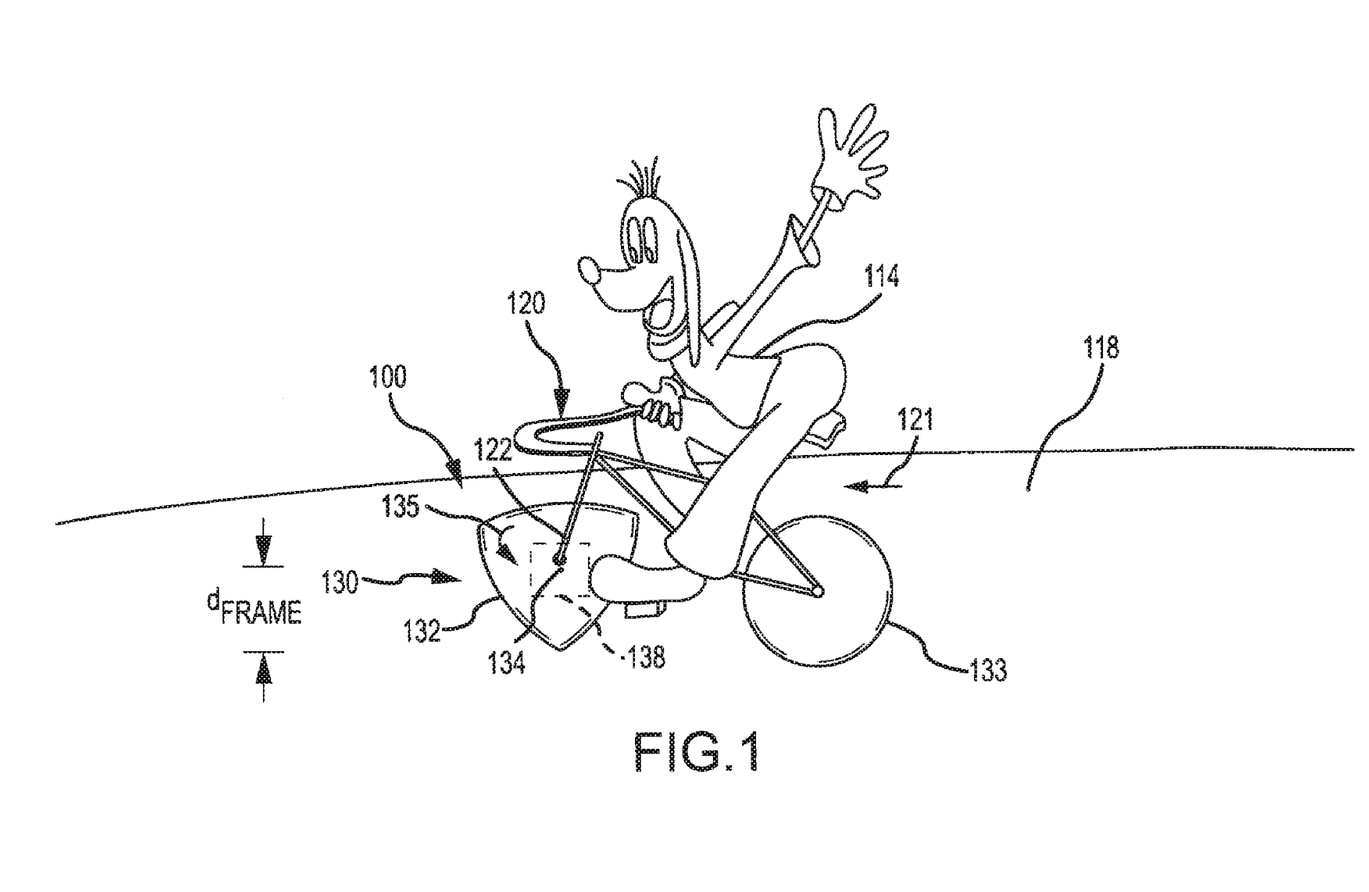
FIG. 1 shows a perspective view of a vehicle (e.g., a bicycle in this example) with a wheel assembly according to one embodiment of the description with a non-circular wheel (e.g., a wheel frame, body, rim, or the like providing a non-circular rolling/contact surface for the vehicle)

More particularly, FIG. 1 illustrates a vehicle 100 utilizing a wheel assembly 130 adapted as explained herein as its front wheel and a standard circular rear wheel 133 (although other embodiments may use more than one assembly 130 for two or more of a vehicle's wheels). As shown, the vehicle 100 takes the form of a bicycle with a frame 120 that is adapted for supporting a rider or user 114 who provides the motive force by pedaling to drive the rear wheel 133 and move the vehicle 100 as shown with arrow 121. The vehicle 100 is supported on and/or rides upon a relatively flat or planar riding surface 118 (e.g., a paved road or the like). The vehicle 100 may also be driven by an alternative motive force (other than rider input via pedals such as via an electric motor or a fuel-based engine or the like). Further, the vehicle 100 may move in either direction and is not limited to moving "forward" as shown.

In the vehicle 100, the frame 120 is supported by (or rigidly attached to) the rear wheel 133 and also the front wheel or wheel assembly 130. Specifically, the frame 120 (or its front fork) is mounted to a portion or component of a radius compensation mechanism 138 (e.g., a cam follower, a slidable actuator pin, or the like). The radius compensation mechanism 138 is mounted in or provided within a wheel body or frame 132 (here shown with a covered body that encloses the mechanism 138 to block contact with its components and/or to disguise operation of the mechanism 138 to enhance the visual impact of the vehicle 100). The mechanism 138 operates, during movement 121 of the vehicle 100, to maintain the distance, $d_{Frame}$, between the road 118 (or the point the wheel 132 contacts the road 118) and the mounting point 122 for the frame 120 substantially constant (e.g., the mounting point or component of the mechanism 138 is forced to ride in a plane parallel to and spaced apart a fixed distance from the road 118 (or wheel contact/mating surface)).

The outer shape of the wheel body/frame 132 may take many forms to implement the vehicle, and it generally may be any shaped wheel including, particularly, wheels with a non-circular shape (when viewed as shown from the side (in profile) or along an axis passing through a center point or a center of rotation 134 (and these two points/locations may differ)). More specifically, the non-circular shapes of the wheel body 132 may have constant diameters (e.g., take the form of a Reuleaux object), but, in many applications, the shapes may be more irregular so as to have different radius values (as measured from a center of rotation 134 to a riding surface contact point on the outer periphery of the wheel body 132) at differing points. Stated differently, the wheel body 132 may have two or more radii. For example, the wheel body 132 may be a triangle or polygon that does not provide a constant diameter wheel. In other cases, a profile of a character's face or body may be used for the wheel. As can be appreciated, the use of a radius compensation mechanism 138 allows the wheel body/frame 132 to have a myriad of outer shapes.

The radius compensation mechanism 138 is adapted to support the vehicle frame at a frame connection point 122 that is (typically) offset a vertical distance from the center of rotation 134 of the wheel body 132. The radius compensation mechanism 138 further is adapted to compensate for changes in the distance between the center of rotation 134 and the riding surface/road 118 during rotation 135 of the wheel body 132 about the center of rotation 134. The mechanism 138 maintains a substantially constant distance, $d_{Frame}$, between the mounting point or frame connection point 122 and the riding surface 118 (or portion of the wheel body 132 that is abutting/contacting the road/surface 118).

One technique proposed by the inventor to address the problem of varying or non-constant wheel radius is to provide a cam-based compensation mechanism in each non-circular wheel assembly. Briefly, compensation for changing radius may be achieved with a cam, which turns or translates the rotary motion of the rotating wheel into a linear motion that negates the geometry of the changing radius (e.g., maintains the constant distance between the mounting location of the vehicle frame to the wheel and the riding surface). A compensation mechanism may be designed to allow the center of rotation of the wheel to move with respect to the ground or riding surface. Concurrently, one or more cam followers are riding in a cam track (or on a cam surface(s)) and act to maintain a constant height for a frame mounting point/connector attached to the follower(s) above the ground/riding surface. The compensating mechanism may include a cam and a follower(s) and also a linear bearing that constrains the center of rotation of the wheel to cause the rotation movement to be translated into a vertical movement along a vertical axis.

Figure 2:
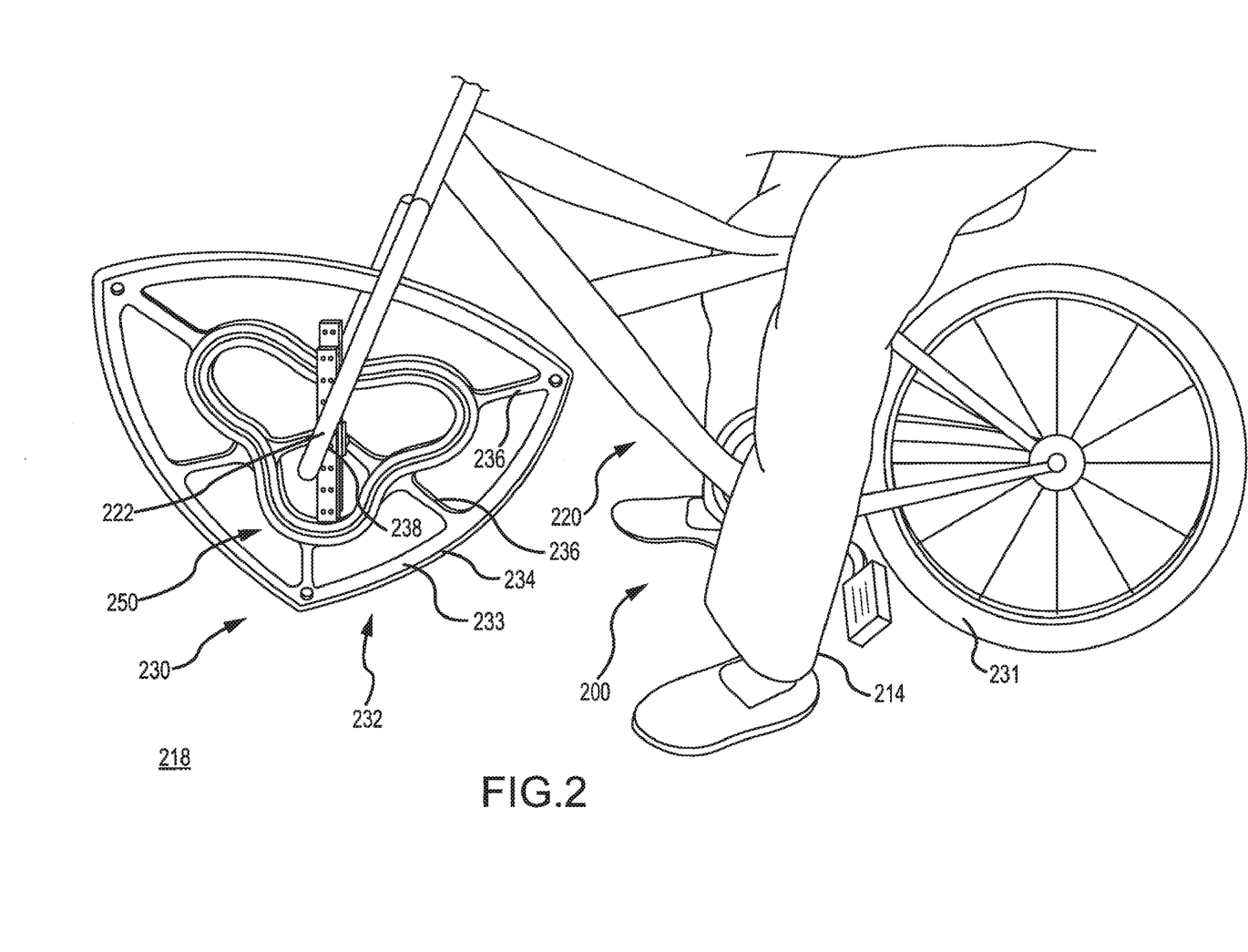
FIG. 2 shows a perspective, partial view of a vehicle (e.g., a bicycle) with a wheel assembly of one exemplary embodiment that uses a cam arrangement as part of the radius compensation assembly or mechanism to maintain a constant ride height (or constant distance from a frame mount location to a planar or flat riding surface (e.g., to an existing/current low point on the wheel contact surface)

FIG. 2 illustrates in more detail a vehicle 200 that may be ridden by a rider/user 214 and driven by rotating a conventional rear wheel 231 (such as by pedaling as is common with bicycles) or a non-standard or non-round/circular rear wheel 231 (not shown). The vehicle 200 includes a frame 220 that is attached at a connection or mounting point 222 to a wheel assembly 230 of an embodiment of this description. The wheel assembly 230 has a wheel body or frame 232 with an outer rim 233 that defines a non-circular shape (e.g., a triangle with rounded sides). A center of rotation 238 is selected for the wheel body 232, which is in this case the center of the triangular shape of the rim 233 (but this is not required to use the wheel assembly 230). A tire or contact element 234 (e.g., a solid rubber tire, a tire with an air-filled tube, or the like as is common with wheeled vehicles) is provided to facilitate use of the wheel assembly 230 and provide traction with and improved ride on the riding surface 218. The rim 233 may be a metal or other structural material and spokes or ribs 236 are used to connect the rim 233 with a compensation mechanism 250 that is mounted integrally in the wheel assembly 230.

The compensation mechanism 250 in this case includes a cam assembly with a track defined by outer and inner cams (note, the mechanism 250 is explained in more detail with reference to later figures). A center of rotation 238 is provided by inner ribs/supports extending inward from the cams. A pair of linear slide rails are slidably attached to or supported by the wheel body 232 at a first point coinciding with the center of rotation (such as with a linear slide member mating for a sliding engagement with a bearing block). The linear slide rails are attached to or supported by the wheel body 232 at a second point coinciding with a pair of cam followers (not shown in FIG. 2) that ride within the cam track defined by the inner and outer cams of the compensation mechanism 250. The frame 220 is attached at connection/mounting point 222 (e.g., with a front fork of the frame 220) to the mechanism 250.

To provide vertical compensation to the frame 220, the frame 220 may be connected directly to the cam followers or indirectly to the cam followers via connection to the linear slide rails (e.g., to the slide rails at or near the point the cam followers are affixed to the slide rails or at some offset distance from the cam followers). In either case, the linear slide rails move vertically in response to movement of the cam followers in the cam track so as to compensate for changes in the height of the center of rotation 238 relative to the riding surface 218.

Figure 3:
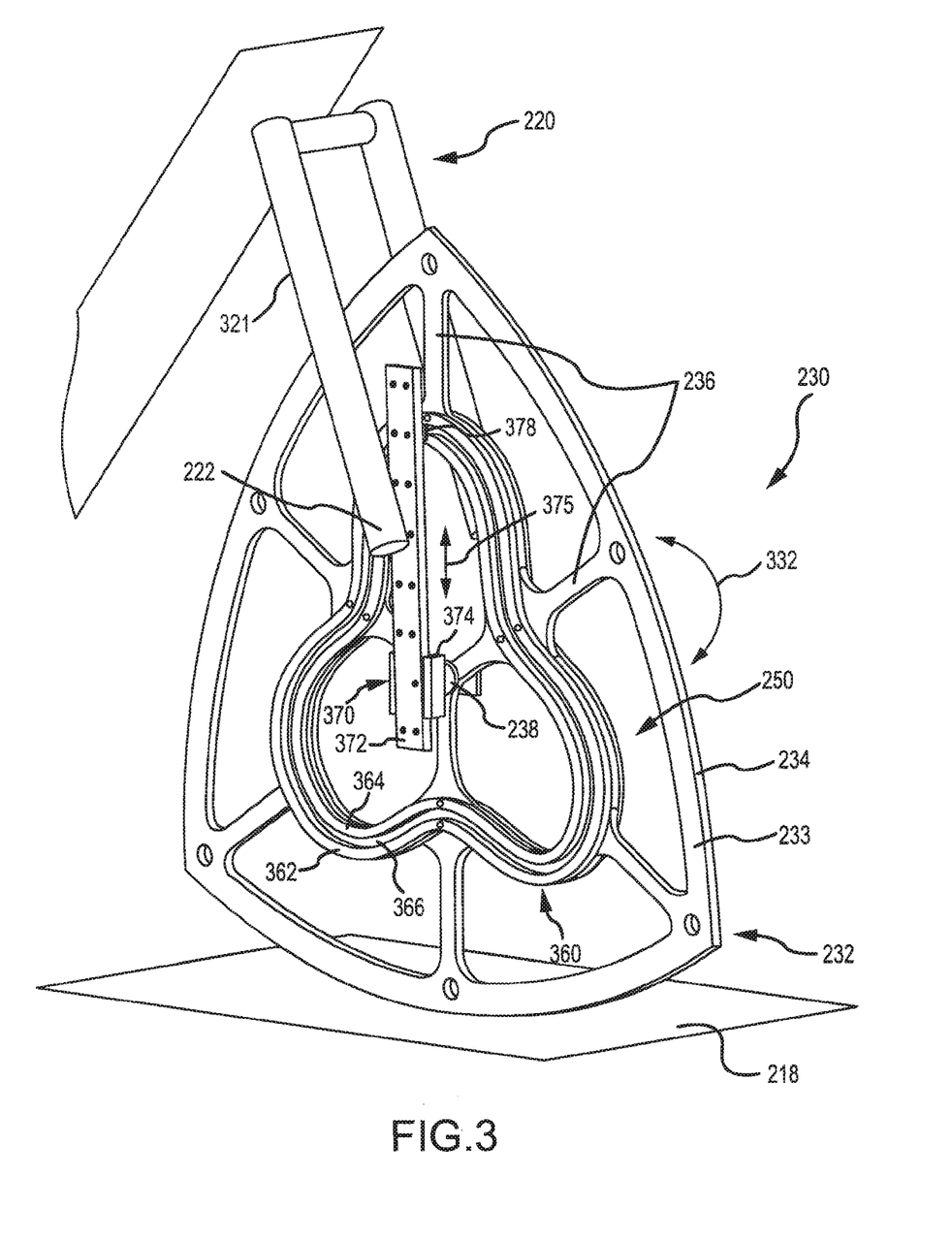
FIG. 3 illustrates in more detail the wheel assembly shown in FIG. 2.

FIG. 3 illustrates a portion of the vehicle 200 of FIG. 2 showing the wheel assembly 230 in more detail. The wheel assembly 230 supports the vehicle frame 220 with a front fork 321 connecting at a connection/mounting point 222 to the wheel assembly 230 (e.g., rigidly to a linear slide rail 372). During rotation 332 of the wheel body 232, the distance between the connection point 222 and the riding surface 218 remains constant or substantially constant due to the operation of the radius compensation mechanism 250.

The compensation mechanism 250 includes a cam assembly 360 that is rigidly supported by the ribs or structural members 236 extending inward from the rim/frame 233. The cam assembly 360 is positioned with its center coinciding with the center of rotation 238 of the wheel body 232 such that it defines a compensatory cam track 366 about this center of rotation 238. The cam assembly 360 includes a cam follower 378 (or pair of such followers with one typically provided on the back side of the shown wheel assembly 230) that rides in the track 366 about the center of rotation 238 during wheel rotation 332 to compensate for changes in the position of the center of rotation 238 relative to the ground/surface 218.

The compensation mechanism 250 includes a linear slide assembly 370 that includes a linear slide rail 372. The cam follower 378 is rigidly affixed to the slide rail 372 at a first end/location, and, in this embodiment, the fork/frame 321 is connected at a point 222 offset from the cam follower 378 (but these may coincide). The slide rail 372 is also supported at a second end by a linear slide 374 (e.g., a location spaced apart from the cam follower 378), and the linear slide is supported at the center of rotation 238 of the wheel body 232. The linear slide 374 acts to constrain the slide rail 372 to remain vertical, and, during rotation 332 of the wheel body 232, the linear slide 374 is able to slide relative to the slide rail 372 as shown with vertical arrow 375. In this manner, the center of rotation 238 is able to vary during rotation 332 while the position of the linear slide rail 372 and the connection point 222 (i.e., the frame 321) is able to maintain a constant height (consistent ride height).

The changes of the position/height of the center of rotation 238 are compensated for by the definition of the cam track 366 (e.g., by varying the separation between the cam follower 378 and the center of rotation 238). The cam track 366 is defined by an outer cam 362 and an offset inner cam 364. The cam follower 378 is positioned within the cam track 366 to abut the cams 362, 364 and is maintained in the track 366 by the linear slide rail 372.

Figure 4:
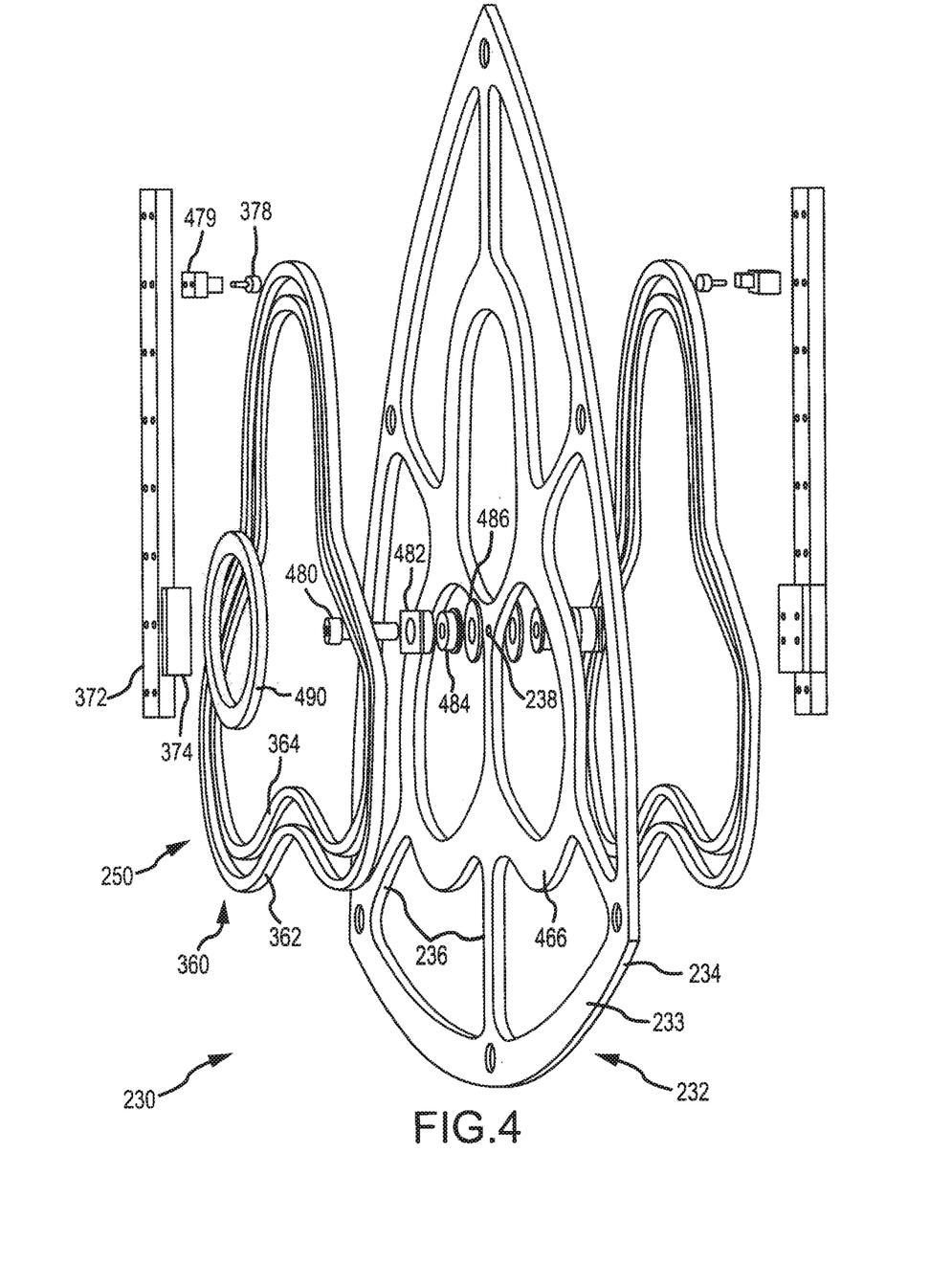
FIG. 4 is an exploded perspective view of the wheel assembly of FIGS. 2 and 3 (without showing the vehicle frame/body)
Figure 5:
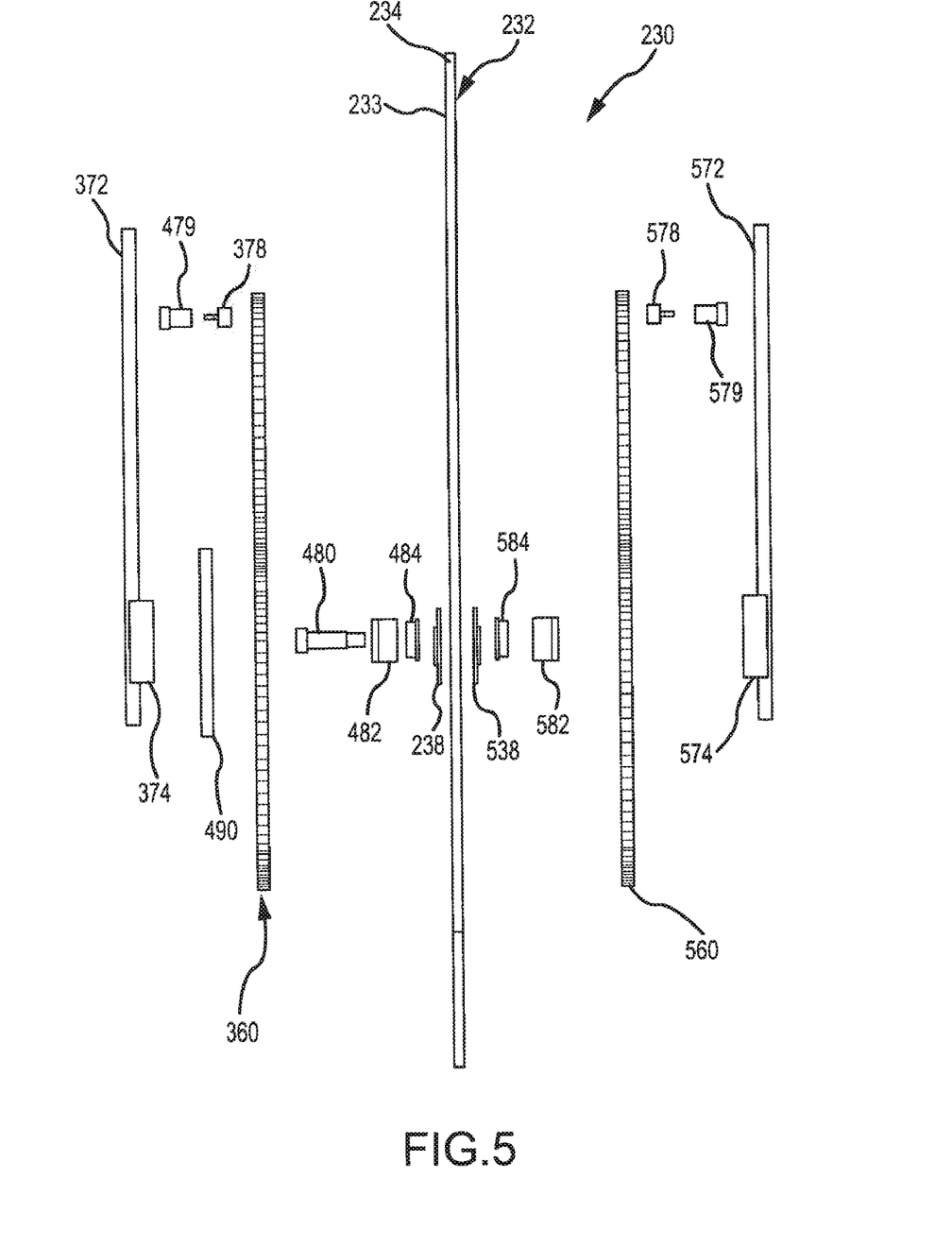
FIG. 5 illustrates a side view of the wheel assembly shown in FIG. 4.

FIGS. 4 and 5 illustrate exploded views of the wheel assembly 230 showing the cam-based, radius compensation mechanism 250 in more detail. As shown, the wheel assembly 230 includes a wheel body 232 that is triangular in shape with a rim/frame 233 that defines a triangular outer contact surface 234 (when viewed in profile or along an axis passing through). The rim 233 may be relatively planar and interconnected with ribs or structural members 236, and an inner support plate 466 may be provided in the body 232 to provide a support or mounting feature for wheel assembly components. The inner support plate 466 may also include the center of rotation 238, and the plate 466 may define the inner surface of the cam track 366 for a first cam follower 378 when the cams 362, 364 of a first cam assembly 360 are attached to the plate 466. A second cam assembly 560 may be attached to the opposite side of the plate 466 to define a second cam track for a second cam follower 578.

To assemble the wheel assembly 230, a shoulder bolt 480 is extended through the center of rotation 238 (a hole provided centrally (in this case) in the wheel body 232). The shoulder bolt 480 extends through a slide bearing block 482, a bearing 484, and washer(s) 486. With such an arrangement, the bearing block 482 is supported firmly in place near the center of rotation but does not rotate with the wheel body 232. At the opposite end, the bolt 480 is threaded into a second bearing block 582, which is also mated with a bearing 584 and one or more washers 538. An optional sprocket mount 490 may be attached to the inner support plate when the wheel assembly 230 is a driven wheel of a vehicle or to otherwise connect the wheel assembly 230 with drive components of a vehicle (in other cases, the wheel assembly 230 may be an idler wheel such as a front wheel of a typical bicycle, a wheel of a cart, or the like).

The cam followers 378, 578 are rigidly attached to linear slide rails 372, 572 with cam follower mounts/pins 479, 579, and the followers 378, 578 are positioned within the cam tracks defined within the cam assemblies 360, 560. A pair of linear slides 374, 574 connects the linear slide rails 372, 572 to the wheel body 232 at the center of rotation 238 via the bearing blocks 482, 582. The bearing blocks 482, 582 are rigidly affixed to the linear slides 374, 574 while the slide rails 372, 572 are able to slide on the inner surfaces of the linear slides 374, 574.

During rotation of the wheel body 232, the cam followers 378, 578 travel in the cam track/path of the cams 360, 560 and act to compensate for changes in the radius of the wheel body 232 or, more particularly, for the current distance between the center of rotation 238 and the riding surface (or a mating point (i.e., the point vertically below the center of rotation when on a flat surface) between the wheel contact surface 234 and the riding surface). The linear slides 374, 574 may move vertically up and down relative to the riding surface such that a distance between the cam followers 378, 578 and the center of rotation 238 (through which the shoulder bolt 480 extends) is reduced and increased, respectively. In this manner, the distance between a mounting location of a vehicle frame and the riding surface is held substantially constant (e.g., the linear slide rails 372, 572 do not move vertically up and down relative to the riding surface during wheel body 232 rotation).

In the design of a wheel assembly (such as assembly 230) there are a number of design constraints that may be followed or utilized to provide proper radius compensation for a non-circular wheel body. Two degrees of freedom may be provided for the wheel, which lies on a plane (wheel plane), and these may include rotation about the horizontal axis orthogonal to the wheel plane (or x-axis or an axis parallel to a ride surface or ground plane) and translation in the vertical axis (or y-axis or an axis perpendicular to the ride surface or ground plane). It may also be useful to provide a constant position in the vertical or y-axis of the cam follower (e.g., maintain a constant height of the cam follower(s) relative to the ride surface or ground plane or mating point on the wheel body's contact surface) so as to maintain a constant height of the vehicle mounting point (e.g., to provide constant ride height). Further, full constraint of the cam(s) relative to the wheel is typically necessary. If the wheel is to be steerable, the caster may need to be zero degrees, e.g., the axis of rotation may be aligned with the vertical or y-axis.

The wheel assembly 230 shown in FIGS. 2-5 is modular in the sense that it can simply be used to replace an existing, conventional wheel with little or no modification of the vehicle. As shown in FIGS. 2-5, two linear slide rails 372, 572 are attached to the vehicle frame/body 220 and are constrained such that they are parallel to each other and are aligned with the vertical axes. Two bearing blocks 482, 582 are mounted to the linear slides 374, 574 such that the wheel body 232 may rotate about the x-axis (e.g., about an axis passing through the center of rotation 238) and also translate in the y-axis (e.g., the linear slides 374, 574 can slide vertically up and down the slide rails 372, 572). The two identical cams or cam assemblies 360, 560 are rigidly attached to the wheel body 232 and aligned properly with the wheel body 232 (e.g., with a center of the defined cam track coinciding with the center of rotation and aligned to provide pre-defined vertical distance compensation for changing radii of the wheel body 232). The cam followers 378, 578 are rigidly attached to the vehicle (directly or via the slide rails 372, 572) and aligned properly on the cam assemblies 360, 560.

An important aspect of designing a wheel assembly to provide compensation is to determine at any point of a wheel's rotation the amount of vertical compensation that should be provided by the compensation mechanism. In a cam-based system, the inner and outer cams (and defined cam track) may be defined based on the shape of the wheel body (or its outer circumference/perimeter or shape of the outer contact surface of the wheel body). The shape of the wheel body does not need to be symmetrical or convex although shapes with relatively small radius changes may support a smoother operating cam (e.g., with less extreme changes having to be accounted for with the cam track).

Figure 6:
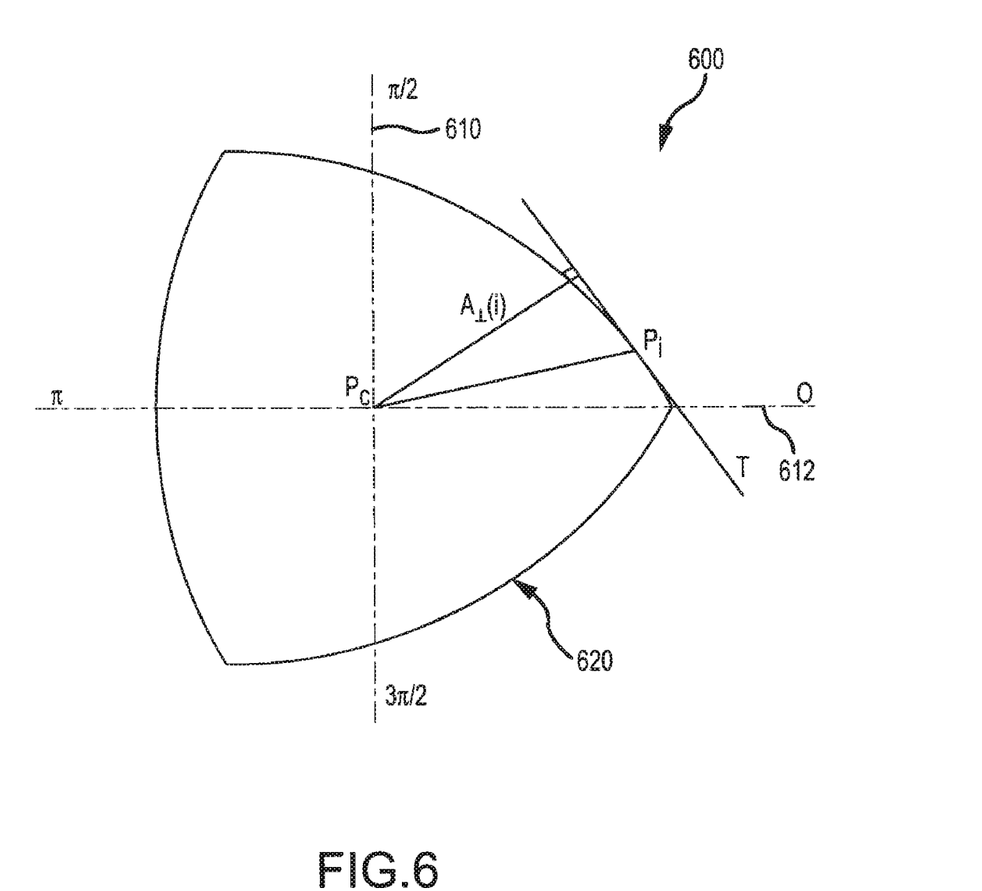
FIG. 6 shows one technique for characterizing or mapping the changing height of the center of rotation of a wheel for use in determining an amount/magnitude of a radius compensation value for use in defining a compensation mechanism (e.g., a shape of a cam, movement/positioning of a linear actuator, or the like)

FIG. 6 illustrates a graph 600 that may be used to characterize a wheel body's changing radius (e.g., the triangular wheel body shown in prior figures or the like) and then design/calculate a cam shape. For any particular wheel shape, a point or center of rotation, $P_c$, is chosen, and the outer profile of the wheel body (or shape of the contact surface) is mapped as shown at 620. In graph 600, the wheel body is overlaid on a 360-degree polar coordinate system defined by axes 610, 612 (with the center of rotation, $P_c$, coinciding with the center of the coordinate system). In some cases, only portions of the wheel body shape that will touch the riding surface or ground are considered in the cam calculations (radius compensation determinations), such that any concave sections may be disregarded. For every point, $p_i$, on the perimeter of the wheel body shape a tangent line, T, may be computed (at $p_i$). Then, a line, A⊥, is drawn from the point of rotation, $P_c$ and orthogonal to the tangent line, T. Thus, because the line, A⊥, is the distance from center of rotation, $P_c$ to tangent line, T (which may be thought of as representing the riding surface or ground plane during rotation/use of the wheel body on a vehicle), the radius change of the cam over an interval is equal to the change in this line over the same interval (e.g., $\Delta r_c = \Delta A\perp$). The curve of the cam (and cam track between inner and outer cams) may be characterized by plotting A⊥(i).

Figure 7:
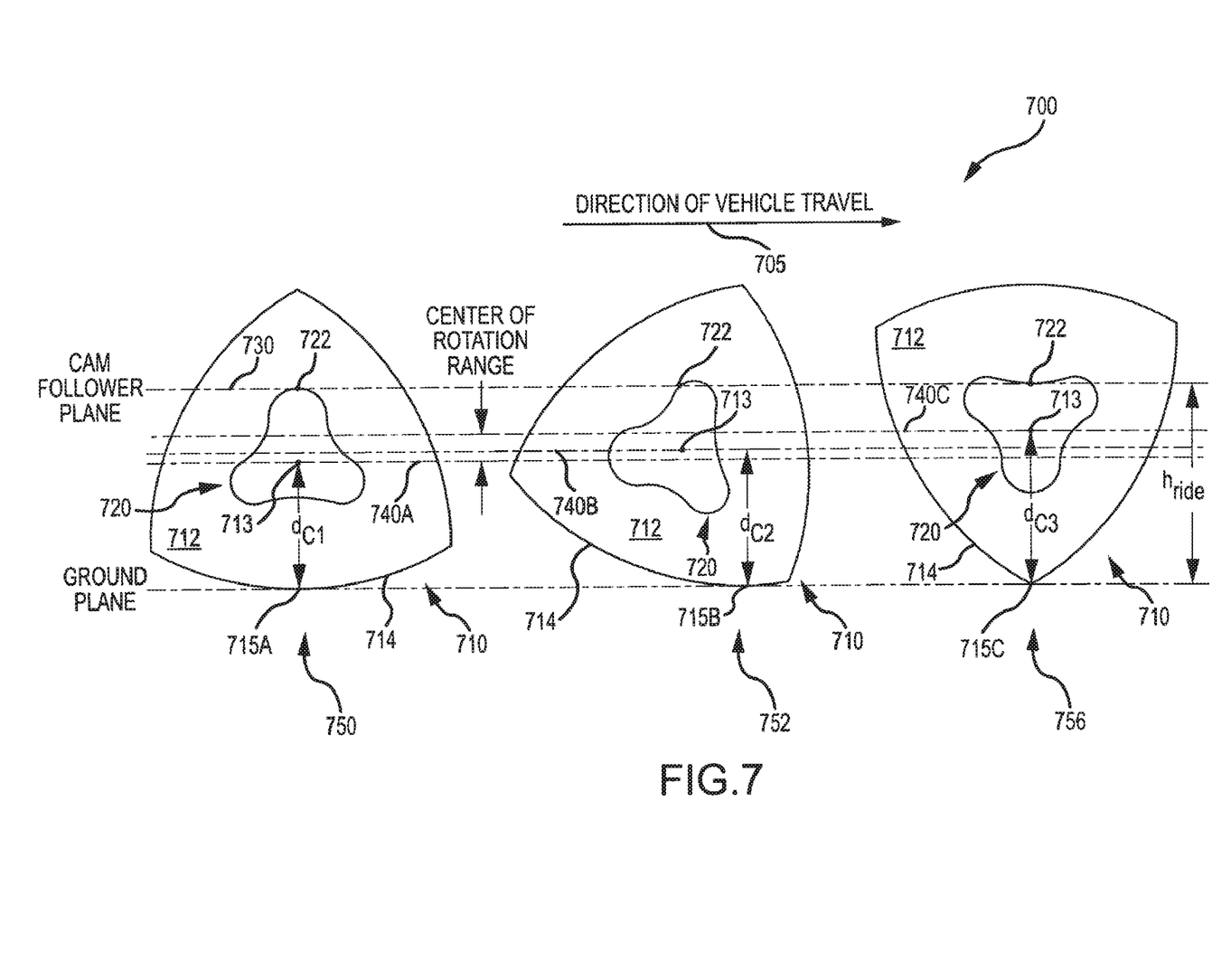
FIG. 7 illustrates a wheel assembly with a cam-based, radius compensation mechanism in three positions as it rolls or travels along a flat riding surface, which shows variance of a position of the center of rotation relative to the riding surface but a constant or consistently maintained ride (or mounting location) height (which corresponds to a position of a cam follower)

FIG. 7 may be useful for further explaining the use of a compensation mechanism to compensate for changing radii of a non-circular wheel. As shown with schematic 700, a wheel assembly 710 is shown moving from a first position 750 to a second position 752 and then on to a third position 756. The wheel assembly 710 includes a non-circular body 712 with a perimeter edge or contact surface 714 that is shown to have a triangular shape (when viewed from the side or along/parallel to an axis passing through the center of rotation). With the wheel body 712 in the first position 750, the contact surface 714 contacts or abuts a riding surface or ground plane at a point 715A. A center of rotation, 713 or c, has been chosen for the wheel body 712, and in the position 750, the radius of the wheel 710 is shown as a first distance, $d_{c1}$ (which, in this example, is one of the smaller radii of the wheel body 712) as measured between the ground plane and a plane 740A parallel to the ground plane and passing through the center of rotation 713.

The wheel assembly 710 also includes a cam assembly 720 that defines a track as shown in which a cam follower 722 is caused to ride/travel (with the cam follower affixed to a linear slide rail as discussed above). The cam follower plane is shown at 730 and is a plane that is parallel to the ground plane and that passes through the cam follower 722, and it will be understood that if this plane 730 is maintained constant with wheel rotation that a vehicle frame that is rigidly linked to this cam follower 722 will also be maintained at a constant ride height (which may or may not coincide with the height of the cam follower plane as is the case in FIG. 7 as shown with, the distance, $h_{ride}$).

As shown in FIG. 7, the wheel body 712 is rotated on the ground plane to a second position 752. In this position 752, the contact surface 714 now contacts the ground plane at contact point 715B, which causes the wheel body radius to change as shown at $d_{c2}$. Particularly, as shown with plane 740B, the radius, $d_{c2}$, is greater than the wheel radius dc1, in the first or prior position. However, the cam follower 722 has traveled in the cam path of cam assembly 720 to a new position that has caused the cam follower plane 730 to remain a constant distance, $h_{ride}$, from the ground plane (e.g., the cam follower 722 is the same distance from the ground plane in positions 750 and 752 even though the wheel body radius has increased in magnitude). Likewise, when the wheel body 712 rolls to a third position 756, the center of rotation 713 is now at a third distance (or wheel radius), $d_{c3}$, that is even further from the ground plane as shown with plane 740C.

However, the cam follower 722 has traveled in the cam track defined in cam assembly 720 such that the cam follower plane 730 is still at the same height (or ride height), $h_{ride}$, above the ground plane. As shown in graph 700, the center of rotation 713 has a range of heights between the various planes 740A, 740B, and 740C associated with the changing radii, $d_{c1}$, $d_{c2}$, and $d_{c3}$, but the cam follower 722 is maintained at a constant height, $h_{ride}$, as the cam 720 is configured to compensate for varying radius changes of the wheel body 712. In other words, the axis of rotation 713 is reciprocating vertically while the cam follower is not due to the shape of the cam track that is defined for the particular shape of the wheel body contact surface 714.

Figure 8:
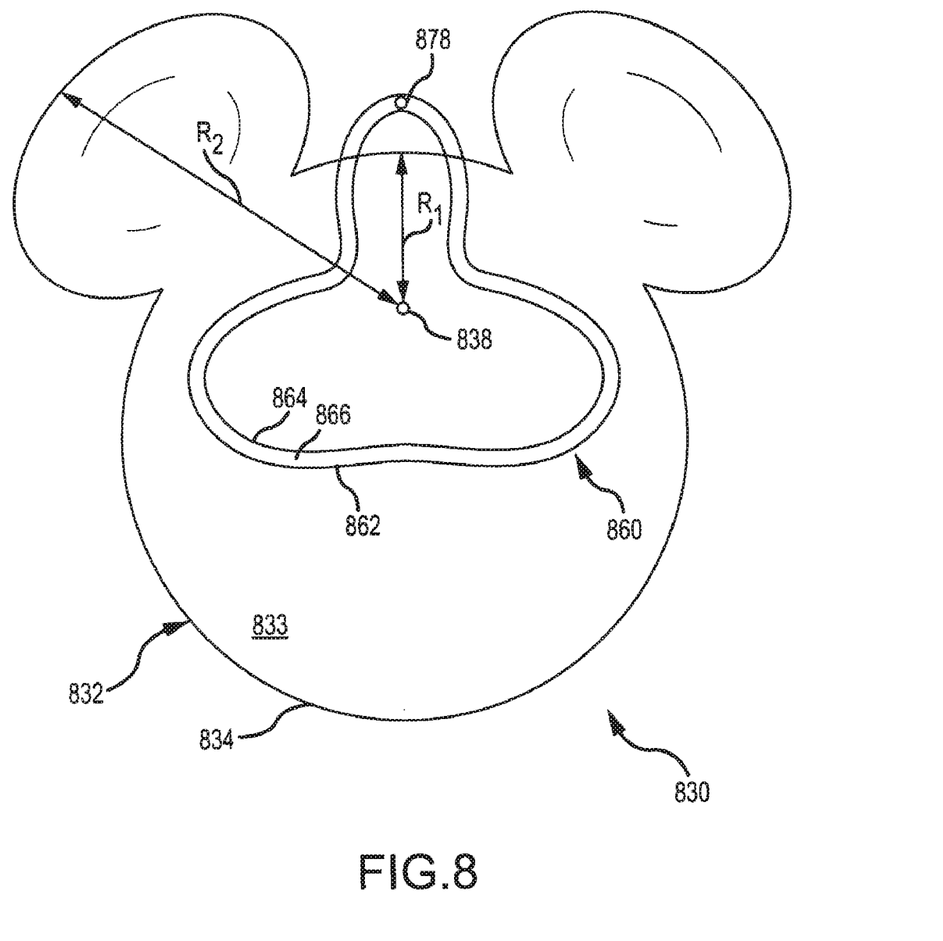
FIG. 8 illustrates in a simplified manner another wheel assembly that may utilize a cam-based, radius compensation mechanism to provide a smooth ride even with widely varying radii of a wheel body (e.g., a non-constant wheel diameter that may be found in wheels having arbitrary shapes).

The shapes that may be compensated for with a cam-based or other radius compensation mechanism are nearly limitless. FIG. 8 provides another example of a wheel assembly 830 that may be used, and the assembly 830 includes a wheel body 832 that is non-circular and has two or more radii. As shown, the wheel body 832 includes a structural rim or frame 833 that defines a non-circular or even irregular contact surface 834 (e.g., provides a shape of a character's or animal's head). The surface 834 defines a number of radii including a first relatively small radius, R1 (which may be disregarded in generating a cam because it falls in a "concave" portion and hence does not touch the ground plane) and a second, much larger radius, R2. The radii, R1 and R2, for the body 832 are measured from a chosen center of rotation 838, which in this case does not coincide with a "center" of the shape (or may not in some cases), to the contact surface or perimeter 834 of the structural frame/rim 833.

To compensate for the changing radii, the wheel assembly 830 includes a radius compensation mechanism 860 that includes a cam track/path 866 defined between an outer cam 862 and an inner cam 864. A cam follower 878 is positioned in the track 866 between the cams 862, 864, and during rotation of the wheel body 832, the cam follower 878 rides in the track 866, which allows the cam follower to remain at a fixed cam follower height relative to the ground plane/riding surface (or a contact point on the contact surface 834 that is abutting the riding surface).

As will be appreciated from the wheel assembly 830, the outer surface 834 of the wheel body 832 may take nearly any shape to practice the concepts described herein. The cam shape is dependent upon the cam radii, and smaller radii may make harsher or more extreme angles. More significant, though, is the change in the cam radii (e.g., the overall size of the cam may be small or large, with a smaller cam producing harsher angles). Hence, it may be desirable to select wheel body shapes that produce smaller changes in radii in the cam to produce smoother angles in the cam track/path for the cam follower to travel during wheel body rotation. Further, choosing a larger cam size may be desirable in some cases to produce smoother curves while still accounting for significant changes in the corresponding wheel body radius.

The above described invention including the preferred embodiment and the best mode of the invention known to the inventor at the time of filing is given by illustrative examples only. It will be readily appreciated that many deviations may be made from the specific embodiments disclosed in the specification without departing from the spirit and scope of the invention.

I claim:

1. A wheel assembly for a vehicle, comprising:
   a wheel body having at least a first radius and a second radius differing from the first radius, wherein the first and second radii are measured from a center of rotation of the wheel body to first and second locations on an outer contact surface of the wheel body; and
   a compensation mechanism including a linear support member with a first connector for attaching the compensation mechanism to a frame of the vehicle and with a second connector adjustably connecting the compensation mechanism to the wheel body, the second connector being positioned proximate to the center of rotation and spaced apart from the first connector, wherein the compensation mechanism comprises a linear position assembly adjusting a position of the second connector relative to the first connector in response to the wheel body being rotated between the first radius and the second radius,
   wherein the linear support member comprises a linear slide rail, wherein the second connector comprises a linear slide slidably engaging the linear slide rail, and wherein the linear slide is supported by an axle member extending from the center of rotation of the wheel body.

2. The assembly of claim 1, wherein a distance between the first connector and the outer contact surface of the wheel body is maintained at a substantially constant value by the linear position assembly when the wheel body is rotated between the first radius and the second radius about an axis passing through the center of rotation.

3. The assembly of claim 1, wherein the linear position assembly comprises a cam assembly including a cam defining a cam track and a cam follower, the cam follower being rigidly coupled to the linear support member at a location spaced apart from the center of rotation and the cam track defined based on geometry of the first and second radii to adjust the position of the second connector relative to the first connector during rotation of the wheel body.

4. The assembly of claim 3, wherein the cam track is defined to cause the linear position assembly to maintain a preset distance between the cam follower and the outer contact surface as measured through the center of rotation of the wheel body as the wheel body is rotated about the center of rotation.

5. The assembly of claim 3, wherein the cam includes an inner cam and an outer cam mounted upon the wheel body and spaced apart to define the cam track along which the cam follower travels during rotation of the wheel body about the center of rotation.

6. The assembly of claim 1, wherein the linear slide rail and the linear slide are constrained to move relative to each other along an axis substantially parallel to an axis extending through a cam follower and through an axis extending through the center of rotation of the wheel body.

7. A vehicle, comprising:
   a vehicle frame; and
   a wheel assembly including:
      a wheel body with a contact surface having a center of rotation and a plurality of differing radii as measured between a plurality of points on the contact surface and the center of rotation;
      a connector for mating the vehicle frame with the wheel body; and
      a compensation mechanism maintaining substantially constant distance between the connector and the contact surface as measured through an axis passing through the center of rotation,
   wherein the connector comprises a linear slide rail and wherein the vehicle frame is attached at a first location on the linear slide rail and the linear slide rail is slidably engaged with the wheel body at a second location spaced apart from the first location and proximate to the center of rotation, and
   wherein the linear slide rail is slidably engaged with the wheel body at the second location with a linear slide pivotally mounted thereto via a connector component extending through the wheel body at the center of rotation.

8. A vehicle, comprising:
   a vehicle frame; and
   a wheel assembly including:
      a wheel body with a contact surface having a center of rotation and a plurality of differing radii as measured between a plurality of points on the contact surface and the center of rotation;
      a connector for mating the vehicle frame with the wheel body; and
      a compensation mechanism maintaining substantially constant distance between the connector and the contact surface as measured through an axis passing through the center of rotation,
   wherein the connector comprises a linear slide rail,
   wherein the vehicle frame is attached at a first location on the linear slide rail and the linear slide rail is slidably engaged with the wheel body at a second location spaced apart from the first location and proximate to the center of rotation,
   wherein the compensation mechanism comprises a cam assembly with a pair of cam tracks on opposite sides of the wheel body about the center of rotation and a pair of cam followers each positioned within one of the cam tracks and mounted to the connector,
   wherein the cam tracks define a non-circular compensation path for the cam followers configured to compensate for the differing radii of a shape of the wheel body to provide the substantially constant distance by moving a frame mounting point on the connector relative to the center of rotation, and
   wherein the connector comprises a pair of linear slide rails provided on opposite sides of the wheel body and the compensation mechanism further comprises a pair of linear slides on opposite sides of the wheel body supported by an axle member extending through the wheel body through the center of rotation, the linear slides each slidably engaging one of the linear slide rails to constrain side-to-side movement of the linear slide rails while allowing linear relative movement of the linear slide rails as the cam followers move along the cam tracks.

9. A wheel assembly for supporting a frame of a vehicle, comprising:

a non-circular wheel with a center of rotation and an external contact surface;

a cam positioned proximate to the center of rotation and defining a cam track;

a cam follower riding on the cam track; and a rail rigidly affixed to the cam follower at a first location and slidably supported by the wheel at a second location proximate to the center of rotation, wherein the cam track is defined based on geometry of the external contact surface to adjust a spacing between the first and second locations, whereby a distance between the first location and the external contact surface is constant during rotation of the non-circular wheel.

10. The wheel assembly of claim 9, wherein the rail comprises a connector for connecting the frame of the vehicle to the non-circular wheel.

11. The wheel assembly of claim 10, wherein the rail is substantially vertical relative to a riding surface plane when connected to the frame of the vehicle.

12. The wheel assembly of claim 9, wherein the cam comprises a pair of inner and outer cams extending about the center of rotation and wherein the cam track is defined between adjacent surfaces of the inner and outer cams.

13. The wheel assembly of claim 9, wherein the non-circular wheel has at least a first radius and a second radius differing from the first radius with the first and second radii being measured from the center of rotation to the external contact surface of the non-circular wheel.

14. The wheel assembly of claim 13, wherein the spacing between the first and second locations is adjusted by the shape of the cam track when the wheel is rotated between the first and second radii based on a difference derived from the first radius and the second radius.

* * * * *